(12) United States Patent
Wen et al.

(10) Patent No.: US 11,939,645 B2
(45) Date of Patent: Mar. 26, 2024

(54) METHOD FOR EXTRACTING LITHIUM FROM CARBONATE CLAY TYPE LITHIUM ORE BASED ON ION EXCHANGE

(71) Applicant: Institute of Geochemistry, Chinese Academy of Sciences, Guiyang (CN)

(72) Inventors: Hanjie Wen, Guiyang (CN); Hannian Gu, Guiyang (CN); Li Zhu, Baiguo Town (CN); Chongguang Luo, Guiyang (CN); Shengjiang Du, Guiyang (CN)

(73) Assignee: INSTITUTE OF GEOCHEMISTRY, CHINESE ACADEMY OF SCIENCES, Guiyang (CN)

( * ) Notice: Subject to any disclaimer, the term of this patent is extended or adjusted under 35 U.S.C. 154(b) by 147 days.

(21) Appl. No.: 17/056,099

(22) PCT Filed: Apr. 3, 2020

(86) PCT No.: PCT/CN2020/083183
§ 371 (c)(1),
(2) Date: Nov. 17, 2020

(87) PCT Pub. No.: WO2021/036263
PCT Pub. Date: Mar. 4, 2021

(65) Prior Publication Data
US 2022/0186341 A1    Jun. 16, 2022

(30) Foreign Application Priority Data
Aug. 26, 2019 (CN) .......................... 201910788413.3

(51) Int. Cl.
*C22B 26/12* (2006.01)
*C22B 1/02* (2006.01)
*C22B 3/42* (2006.01)

(52) U.S. Cl.
CPC ................ *C22B 26/12* (2013.01); *C22B 1/02* (2013.01); *C22B 3/42* (2013.01)

(58) Field of Classification Search
CPC .............. C22B 26/12; C22B 1/02; C22B 3/42
See application file for complete search history.

(56) References Cited

FOREIGN PATENT DOCUMENTS

CN    103173611 A  *  9/2016

* cited by examiner

*Primary Examiner* — Yong L Chu
(74) *Attorney, Agent, or Firm* — Pilloff Passino & Cosenza LLP; Rachel K. Pilloff; Sean A. Passino

(57) ABSTRACT

This invention discloses a method for extracting lithium from carbonate clay type lithium ore based on ion exchange, which belongs to the field of lithium extraction technologies. This method aims to, with iron salt as the extractant, extract lithium into the solution through exchange reaction with lithium ore, which mainly involves the following steps: have clay type lithium ores crushed and ground prior to high-temperature roasting activation, and then conduct iron exchange reaction by iron salt solution while heating, followed by solid-liquid separation by means of filtration. The filtrate obtained will be lithium-bearing solution, and the extraction rate of lithium can reach as high as over 90%.

8 Claims, No Drawings

METHOD FOR EXTRACTING LITHIUM FROM CARBONATE CLAY TYPE LITHIUM ORE BASED ON ION EXCHANGE

FIELD OF THE INVENTION

This invention involves the technical field regarding lithium extraction, especially the method for extracting lithium from carbonate clay type lithium ore based on ion exchange.

BACKGROUND OF THE INVENTION

With the ever-increasing contradiction between the supply and demand of global petroleum resources, hybrid electric vehicles and full-power vehicles have achieved rapid development, accompanied by increasingly high demand on lithium ion batteries, proposing higher requirements for the development and utilization of lithium resources. As an important emerging industrial resource, lithium resources are widely applicable and of important strategic significance. Lithium ores can mainly be divided into the following three types worldwide: rock type (pegmatite type), brine type and clay type. As a new type of lithium ore, the carbonate clay type lithium ore is widely distributed in central Yunnan Province, and the effective development and utilization thereof will well alleviate the high external dependence of lithium resources and other strategic problems faced by China at present.

At present, lithium extraction processes at home and abroad mostly target at rock type (such as spodumene and lepidolite) and brine type (including salt lake type) lithium resources, and it is uncommon to see researches on the extraction of lithium from clay type lithium ore. An authorized patent entitled "a method for extracting lithium from low-grade lithium-bearing clay ore" (application No.: 201410098348.9) reports the modification of the "roasting—heap leaching-wetting" lithium extraction method by adding auxiliary materials (including calcium sulfate, calcium fluoride and sodium sulfate), resolving the problem of extracting lithium from low-grade lithium-bearing clay ore. Another authorized patent entitled "a method for extracting lithium metal from aluminous rocks" (patent application No.: 201110437928.2) provides a method for extracting lithium from well-roasted aluminous rocks with dilute acid as the leaching agent. There is also a similar patented technology entitled "a method for separating lithium from aluminous rocks by mixed acid and preparing lithium carbonate" (application No.: 201310037306.X), which aims to extract lithium from aluminous rocks into the solution by a hot acid system mixing two dilute inorganic acids and one organic acid.

The following are shortages of the aforesaid technologies: the roasting process requires the addition of auxiliary materials, which will not only increase the cost, but also bring impurities to the subsequent purification of lithium solution; the adoption of inorganic acids including sulfuric acid in the process of leaching will result in a large quantity of acid leaching liquid, which is less environmentally friendly and difficult for comprehensive utilization; the adoption of a large quantity and variety of acids may also lead to a high dissolution rate of impurity elements. In summary, despite their high extraction efficiency, existing technologies have such shortages as high leaching rate of impurities including aluminum that will increase the difficulty in subsequent purification and impurity removal and complex process overall.

This invention presents a new process for extracting lithium from clay type lithium ore based on ion exchange by iron salt solution, providing a new low-cost and environmentally friendly technical idea for the development and utilization of lithium resources.

SUMMARY OF THE INVENTION

This invention aims to provide a method for extracting lithium from carbonate clay type lithium ore based on ion exchange to resolve the aforesaid problems in existing technologies. The method is simple and environmentally friendly with low extraction cost and high extraction efficiency.

This invention provides the following scheme for achieving the aforesaid purpose:

This invention provides a method for extracting lithium from carbonate clay type lithium ore based on ion exchange, which involves the following steps:

(1) Crushing: having lithium ore crushed and finely ground;

(2) Roasting treatment: having crushed ore roasted;

(3) Iron exchange: adding the solution of ferric iron salt to the ore treated as specified in Step (2), and then conducting iron exchange reaction while stirring;

(4) Filtration and separation: conducting solid-liquid separation immediately after the completion of reaction, the filtrate obtained being a lithium-bearing solution.

Further, the ore mentioned in Step (1) refers to carbonate clay type lithium ore with the particle size thereof being ground to less than 100 mesh.

Further, the temperature for roasting treatment mentioned in Step (2) is 450-800° C., and the heat preservation time is 1 h.

Further, the ferric iron salt mentioned in Step (3) refers to inorganic ferric iron salt.

Further, the inorganic ferric iron salt refers to ferric sulfate, ferric chloride or ferric nitrate.

Further, the mass fraction of the solution of ferric iron salt is 5-20%.

Further, the ratio between the ore treated as specified in Step (2) and the solution of ferric iron salt is 1 g:5 mL.

Further, the time for the iron exchange reaction mentioned in Step (3) is 1-4 h.

This invention discloses the following technical effects:

Through large quantities of researches, this invention finds that carbonate clay type lithium ore typically exists in a special interlayer adsorption state and occurs between the layers of clay minerals. Upon high-temperature activation treatment, lithium ions existing in the clay structure layer will become more dissoluble and be able to exchange with cations sharing a similar radius with them. Considering that the radius of ferric ion is quite close to that of lithium ion, this invention proposes to adopt iron salt exchange, and has already obtained ideal results. Compared with existing technologies, the technical proposal adopted in this invention has such advantages as low cost, high efficiency, environmental friendliness and simple process, and the solution obtained is nearly neutral, mainly containing such impurities as aluminum and iron (just a small amount), thus being convenient for subsequent separation and purification.

DETAILED DESCRIPTION OF THE INVENTION

A variety of exemplary embodiments of this invention are described in detail herein, which shall not be considered as a limitation of this invention, instead, it shall be understood as a more detailed description of certain aspects, features and embodiments of this invention.

It should be understood that the terms described in this invention are only to describe particular embodiments only and not to limit this invention. In addition, for the numerical range in this invention, it should be understood that each intermediate value between the upper limit and the lower limit of the range is also specifically disclosed. Each smaller range between any stated value or the intermediate value within the stated range and any other stated value or the intermediate value within the stated range is also included in this invention. The upper and lower limits of these smaller ranges can be independently included in or excluded from the numerical range.

Unless otherwise stated, all technical and scientific terms used herein should have the same meaning commonly understood by the ordinary technicians in the field described in this invention.

Although this invention only describes preferred methods and materials, any other method or material similar to or equivalent to those described herein may also be used in the embodiments or tests of this invention. All documents in the specifications are incorporated by reference to disclose and describe the methods and/or materials related to the documents concerned. In case of conflict with any incorporated document, the contents of the specifications shall prevail.

Without deviating from the scope or spirit of this invention, various improvements and changes can be made to the specific embodiments of the specifications, with such improvements and changes being obvious to technicians in this field. Other embodiments obtained from the specifications should also be obvious to the technicians. The specifications and embodiments of this patent application are exemplary only.

Such words as "contain", "include", "possess" and "have" used herein are all open terms, that is, they mean to include but not limited to.

The word "portion" mentioned in this invention shall be understood as mass portions, unless otherwise stated.

Embodiment 1

Have carbonate clay lithium ores crushed and finely ground by a grinder until the particle size thereof is less than 100 mesh, followed by 800° C. roasting and one-hour heat preservation before having them cooled to the room temperature. Add the solution of ferric sulphate with a mass fraction of 5% in the proportion of 1 g:5 ml and, upon uniform mixing, heat the mixture to 80° C. on a thermostatic water bath oscillator. After that, conduct ion exchange reaction for one hour while stirring and, upon the completion of reaction, conduct filtration while the mixture is still hot to obtain the lithium-bearing solution; the final leaching rate of lithium is 60%.

Embodiment 2

Have carbonate clay lithium ores crushed and finely ground by a grinder until the particle size thereof is less than 100 mesh, followed by 650° C. roasting and one-hour heat preservation before having them cooled to the room temperature. Add the solution of ferric chloride with a mass fraction of 16% in the proportion of 1 g:5 ml and, upon uniform mixing, heat the mixture to 85° C. on a thermostatic water bath oscillator. After that, conduct ion exchange reaction for three hours while stirring and, upon the completion of reaction, conduct filtration while the mixture is still hot to obtain the lithium-bearing solution; the final leaching rate of lithium is 90.21%.

Embodiment 3

Have carbonate clay lithium ores crushed and finely ground by a grinder until the particle size thereof is less than 100 mesh, followed by 700° C. roasting and one-hour heat preservation before having them cooled to the room temperature. Add the solution of ferric nitrate with a mass fraction of 13% in the proportion of 1 g:5 ml and, upon uniform mixing, heat the mixture to 78° C. on a thermostatic water bath oscillator. After that, conduct ion exchange reaction for two hours while stirring and, upon the completion of reaction, conduct filtration while the mixture is still hot to obtain the lithium-bearing solution; the final leaching rate of lithium is 80.21%.

Embodiment 4

Have carbonate clay lithium ores crushed and finely ground by a grinder until the particle size thereof is less than 100 mesh, followed by 600° C. roasting and one-hour heat preservation before having them cooled to the room temperature. Add the solution of ferric chloride with a mass fraction of 5% in the proportion of 1 g:5 ml and, upon uniform mixing, heat the mixture to 90° C. on a thermostatic water bath oscillator. After that, conduct ion exchange reaction for three hours while stirring and, upon the completion of reaction, conduct filtration while the mixture is still hot to obtain the lithium-bearing solution; the final leaching rate of lithium is 71%.

Embodiment 5

Have carbonate clay lithium ores crushed and finely ground by a grinder until the particle size thereof is less than 100 mesh, followed by 600° C. roasting and one-hour heat preservation before having them cooled to the room temperature. Add the solution of ferric chloride with a mass fraction of 15% in the proportion of 1 g:5 ml and, upon uniform mixing, heat the mixture to 90° C. on a thermostatic water bath oscillator. After that, conduct ion exchange reaction for three hours while stirring and, upon the completion of reaction, conduct filtration while the mixture is still hot to obtain the lithium-bearing solution; the final leaching rate of lithium is 80%.

Embodiment 6

Have carbonate clay lithium ores crushed and finely ground by a grinder until the particle size thereof is less than 100 mesh, followed by 600° C. roasting and one-hour heat preservation before having them cooled to the room temperature. Add the solution of ferric chloride with a mass fraction of 15% in the proportion of 1 g:5 ml and, upon uniform mixing, heat the mixture to 90° C. on a thermostatic water bath oscillator. After that, conduct ion exchange reaction for four hours while stirring and, upon the completion of reaction, conduct filtration while the mixture is still hot to obtain the lithium-bearing solution; the final leaching rate of lithium is 85%.

Embodiment 7

Have carbonate clay lithium ores crushed and finely ground by a grinder until the particle size thereof is less than 100 mesh, followed by 600° C. roasting and one-hour heat preservation before having them cooled to the room temperature. Add the solution of ferric chloride with a mass fraction of 20% in the proportion of 1 g:5 ml and, upon uniform mixing, heat the mixture to 90° C. on a thermostatic water bath oscillator. After that, conduct ion exchange reaction for three hours while stirring and, upon the completion of reaction, conduct filtration while the mixture is still hot to obtain the lithium-bearing solution; the final leaching rate of lithium is 85%.

Embodiment 8

Have carbonate clay lithium ores crushed and finely ground by a grinder until the particle size thereof is less than 100 mesh, followed by 600° C. roasting and one-hour heat preservation before having them cooled to the room temperature. Add the solution of ferric chloride with a mass fraction of 15% in the proportion of 1 g:5 ml and, upon uniform mixing, heat the mixture to 80° C. on a thermostatic water bath oscillator. After that, conduct ion exchange reaction for one hour while stirring and, upon the completion of reaction, conduct filtration while the mixture is still hot to obtain the lithium-bearing solution; the final leaching rate of lithium is 81.43%.

Embodiment 9

Have carbonate clay lithium ores crushed and finely ground by a grinder until the particle size thereof is less than 100 mesh, followed by 700° C. roasting and one-hour heat preservation before having them cooled to the room temperature. Add the solution of ferric chloride with a mass fraction of 15% in the proportion of 1 g:5 ml and, upon uniform mixing, heat the mixture to 90° C. on a thermostatic water bath oscillator. After that, conduct ion exchange reaction for three hours while stirring and, upon the completion of reaction, conduct filtration while the mixture is still hot to obtain the lithium-bearing solution; the final leaching rate of lithium is 90.43%.

Embodiment 10

Have carbonate clay lithium ores crushed and finely ground by a grinder until the particle size thereof is less than 100 mesh, followed by 600° C. roasting and one-hour heat preservation before having them cooled to the room temperature. Add the solution of ferric chloride with a mass fraction of 15% in the proportion of 1 g:5 ml and, upon uniform mixing, heat the mixture to 70° C. on a thermostatic water bath oscillator. After that, conduct ion exchange reaction for one hour while stirring and, upon the completion of reaction, conduct filtration while the mixture is still hot to obtain the lithium-bearing solution; the final leaching rate of lithium is 73%.

Embodiment 11

Have carbonate clay lithium ores crushed and finely ground by a grinder until the particle size thereof is less than 100 mesh, followed by 600° C. roasting and one-hour heat preservation before having them cooled to the room temperature. Add the solution of ferric nitrate with a mass fraction of 10% in the proportion of 1 g:5 ml and, upon uniform mixing, heat the mixture to 90° C. on a thermostatic water bath oscillator. After that, conduct ion exchange reaction for three hours while stirring and, upon the completion of reaction, conduct filtration while the mixture is still hot to obtain the lithium-bearing solution; the final leaching rate of lithium is 71%.

Embodiment 12

Have carbonate clay lithium ores crushed and finely ground by a grinder until the particle size thereof is less than 100 mesh, followed by 600° C. roasting and one-hour heat preservation before having them cooled to the room temperature. Add the solution of ferric nitrate with a mass fraction of 20% in the proportion of 1 g:5 ml and, upon uniform mixing, heat the mixture to 90° C. on a thermostatic water bath oscillator. After that, conduct ion exchange reaction for three hours while stirring and, upon the completion of reaction, conduct filtration while the mixture is still hot to obtain the lithium-bearing solution; the final leaching rate of lithium is 78%.

Embodiment 13

Have carbonate clay lithium ores crushed and finely ground by a grinder until the particle size thereof is less than 100 mesh, followed by 600° C. roasting and one-hour heat preservation before having them cooled to the room temperature. Add the solution of ferric nitrate with a mass fraction of 15% in the proportion of 1 g:5 ml and, upon uniform mixing, heat the mixture to 90° C. on a thermostatic water bath oscillator. After that, conduct ion exchange reaction for four hours while stirring and, upon the completion of reaction, conduct filtration while the mixture is still hot to obtain the lithium-bearing solution; the final leaching rate of lithium is 83.70%.

Embodiment 14

Have carbonate clay lithium ores crushed and finely ground by a grinder until the particle size thereof is less than 100 mesh, followed by 800° C. roasting and one-hour heat preservation before having them cooled to the room temperature. Add the solution of ferric nitrate with a mass fraction of 15% in the proportion of 1 g:5 ml and, upon uniform mixing, heat the mixture to 90° C. on a thermostatic water bath oscillator. After that, conduct ion exchange reaction for three hours while stirring and, upon the completion of reaction, conduct filtration while the mixture is still hot to obtain the lithium-bearing solution; the final leaching rate of lithium is 75%.

The experimental results reveal that the leaching rate of lithium differs among different inorganic ferric iron salts in the ion exchange reaction, which is related to such factors as the concentration of ferric ion, the roasting temperature of ore and the temperature and time of reaction. It is possible to obtain ideal extraction results through combining different ferric iron salts with different factors just mentioned under different conditions, as illustrated in the embodiments above.

The embodiments above are only to describe the preferred patterns of this invention ant not to limit the scope of this invention. Without deviating from the design spirit of this invention, all modifications and improvements made by ordinary technicians in this field to the technical proposal of this invention shall fall within the protection scope determined in the claims of this invention.

The invention claimed is:

1. A method for extracting lithium from carbonate clay type lithium ore based on ion exchange, the method comprising the following steps:
   (1) Crushing: having lithium ore crushed and finely ground;
   (2) Roasting treatment: having crushed ore roasted at a temperature of 450-800° C.;
   (3) Iron exchange: adding a solution of ferric iron salt to the ore treated as specified in Step (2), and then conducting iron exchange reaction while stifling;
   (4) Filtration and separation: conducting solid-liquid separation immediately after the completion of reaction, the filtrate obtained being a lithium-bearing solution.

2. The method for extracting lithium from carbonate clay type lithium ore based on ion exchange according to claim 1, wherein the ore mentioned in Step (1) is carbonate clay type lithium ore with a particle size thereof being ground to less than 100 mesh.

3. The method for extracting lithium from carbonate clay type lithium ore based on ion exchange according to claim 1, wherein heat preservation time for the roasting treatment mentioned in Step (2) is 1 h.

4. The method for extracting lithium from carbonate clay type lithium ore based on ion exchange according to claim 1, wherein the ferric iron salt mentioned in Step (3) is inorganic ferric iron salt.

5. The method for extracting lithium from carbonate clay type lithium ore based on ion exchange according to claim 4, wherein the inorganic ferric iron salt is ferric sulfate, ferric chloride or ferric nitrate.

6. The method for extracting lithium from carbonate clay type lithium ore based on ion exchange according to claim 1, wherein a mass fraction of the solution of ferric iron salt is 5-20%.

7. The method for extracting lithium from carbonate clay type lithium ore based on ion exchange according to claim 6, wherein a ratio between the ore treated as specified in Step (2) and the solution of ferric iron salt is 1 g: 5 mL.

8. The method for extracting lithium from carbonate clay type lithium ore based on ion exchange according to claim 1, wherein time for the iron exchange reaction mentioned in Step (3) is 1-4 h.

* * * * *